United States Patent [19]

Aoki et al.

[11] Patent Number: 4,568,953

[45] Date of Patent: Feb. 4, 1986

[54] LIQUID INJECTION RECORDING APPARATUS

[75] Inventors: Seiichi Aoki, Machida; Akio Saito, Zama; Tadayoshi Inamoto, Hiratsuka; Katsuyuki Yokoi, Sagamihara; Masami Ikeda, Machida, all of Japan

[73] Assignee: Canon Kabushiki Kaisha, Tokyo, Japan

[21] Appl. No.: 560,528

[22] Filed: Dec. 12, 1983

[30] Foreign Application Priority Data

Dec. 28, 1982 [JP] Japan ............................... 57-230074

[51] Int. Cl.⁴ ............................................ G01D 15/16

[52] U.S. Cl. ............................................ 346/140 R

[58] Field of Search .................................... 346/140 R

[56] References Cited

U.S. PATENT DOCUMENTS

| | | | |
|---|---|---|---|
| 3,974,508 | 8/1976 | Blumenthal | 346/140 R |
| 4,007,465 | 2/1977 | Chaudhary | 346/140 R |
| 4,184,169 | 1/1980 | Taylor | 346/140 R |
| 4,317,124 | 2/1982 | Shirato | 346/140 R |
| 4,380,770 | 4/1983 | Maruyama | 346/140 R |

*Primary Examiner*—Joseph W. Hartary

*Attorney, Agent, or Firm*—Fitzpatrick, Cella, Harper & Scinto

[57] ABSTRACT

A liquid injection recording apparatus has liquid flow paths communicating with an inflow path for supplying liquid and with an outflow path for discharging the liquid and having in the intermediate portions thereof discharge ports for discharging the liquid and forming flying drops of liquid, and a liquid projection energy generating member for forming the drops of liquid. The liquid is forcibly discharged from the outflow path.

2 Claims, 1 Drawing Figure

LIQUID INJECTION RECORDING APPARATUS

BACKGROUND OF THE INVENTION

1. Field of the Invention

This invention relates to a liquid injection (ink jet) recording apparatus, and more particularly to a liquid injection recording apparatus in which stability of liquid projection can always be maintained.

2. Description of the Prior Art

Non-impact recording methods have been attracting attention in that the noise produced during recording is negligible. Among them, the ink jet recording methods which are capable of high-speed recording and of recording without requiring a special process such as fixation on plain paper are highly effective methods, and various systems of such methods have heretofore been proposed and apparatuses embodying them have been devised. Some of them have been improved and commercialized and some of them are still being studied in order to be put into practice.

Among them, the methods disclosed, for example, in Japanese Laid-open Patent Application No. 51837/1979 and German Laid-open Patent Application (DOLS) No. 2843064 have a feature different from other ink jet recording methods in that thermal energy is caused to act on ink liquid to thereby provide generative power for forming flying drops of liquid.

That is, in the recording methods disclosed in the aforementioned publications, the liquid subjected to the action of thermal energy undergoes a state change involving a sharp increase in volume including generation of bubbles and, due to the force resulting from such state change, drops of liquid are projected from the discharge port at the end of the recording head which is a major portion of the recording apparatus, and fly and adhere to a recording medium, thus accomplishing recording.

Particularly, the ink jet recording method disclosed in DOLS 2843064 can not only be very effectively applied to the so-called drop-on demand recording method, but also the recording head portion facilities the formation of high-density multi-orifice heads of the full line type and thus, this method has an advantage that images of high resolution and high quality can be obtained at a high speed.

Thus, the above-described ink jet recording method has various advantages, but in order for images of high resolution and high quality to be recorded for a long time or for the service life of the apparatus to be greatly improved, some maintenance system to ensure that drops of liquid are properly projected is an indispensable element. That is, means for eliminating the clogging which may result from the stay of bubbles in the ink jet head, the adherence of ink to the nozzle portion due to evaporation of the ink from discharge ports, or the entry of dust is required. Also, in the aforementioned ink jet recording apparatus using an electrothermal converting element, a thermal action which will bring about the gasified state of ink occurs and therefore, for example, where continuous recording is effected for a very long time, insoluble deposits may be created on the thermally acting surface to clog the discharge ports or the like and thus, means for eliminating such deposits is also required.

Such a maintenance system is an indispensable element for greatly improving the service life in ink jet recording apparatuses using other methods than the method of causing thermal energy to act to thereby project drops of liquid as previously described.

For the solution of such problems, there are known (1) a system whereby the discharge ports are capped and obstacles and ink in the ink supply path are sucked by a suction mechanism, and (2) a system whereby viscosity is regulated by the use of ink and ink solvent. However, these systems have suffered from a problem that the apparatus becomes considerably complicated. For example, in the case of the system (1), the accuracy of the position of the discharge ports and the position of the suction holes disposed in the capping mechanism must be ensured and difficulties, such as manufacturing and assembling the parts of the apparatus with sufficient accuracy, are encountered. In the case of the system (2), an ink tank, a pump and a valve mechanism must be provided discretely from one another and this leads to a more complicated mechanism. A problem common to these two systems is that when recovery of the projection state is to be carried out, ink and obstacles are finally discharged from the discharge ports for discharging the ink, and, for example, where obstacles larger than the discharge ports (dust, deposits, etc.) are present, the obstacles cannot be eliminated by any means.

SUMMARY OF THE INVENTION

It is an object of the present invention to solve the above-noted problems and to provide a liquid injection (ink jet) recording apparatus which is simple in construction and low in manufacturing cost and which can cope with the tendency of discharge ports toward a higher density.

It is also an object of the present invention to provide a liquid injection recording apparatus which is provided with liquid flow paths communicating with an inflow path for supplying liquid and an outflow path for discharging the liquid and having in the intermediate portions thereof discharge ports for discharging the liquid and forming flying drops of liquid, and a liquid projection energy generating member for forming the drops of liquid and in which the liquid is forcibly discharged from the outflow path.

The invention will become fully apparent from the following detailed description of an embodiment thereof taken in conjunction with the accompanying drawing.

DESCRIPTION OF THE PREFERRED EMBODIMENT

Figure 1:
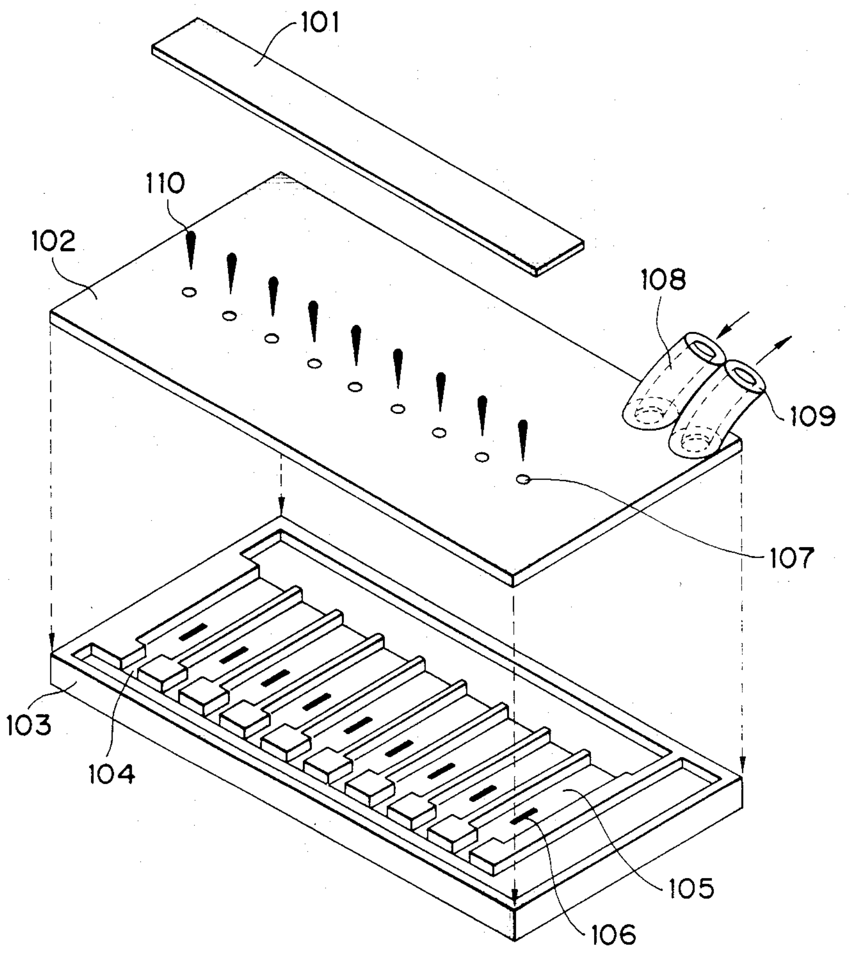
FIG. 1 is a schematic perspective view for illustrating an embodiment of the present invention.

Referring to FIG. 1 which is a schematic perspective view showing a preferred embodiment of the present invention, reference numeral 101 designates a plate for closing discharge ports 107, reference numeral 102 denotes an orifice plate in which the discharge ports 107 are formed, reference numeral 103 designates a base plate, reference numeral 104 denotes ink flow paths, and reference numeral 105 designates ink supply paths. Reference numeral 106 denotes liquid drop projection means, reference numeral 108 designates a tube for supplying ink to the ink supply paths 105, reference numeral 109 denotes a tube for discharging therethrough the ink from the ink flow paths 104, and reference numeral 110 designates drops of ink discharged from the discharge ports 107. The tube 108 is designed to be supplied with ink from an ink tank (not shown), and the tube 109 is connected to an apparatus (not shown) for generating a negative pressure. In the Figure, the orifice plate 102 is shown as being separate from the base plate 103 for the purpose of illustration, but actually the orifice plate 102 is of course attached to the base plate 103. As the liquid drop projection means 106, which comprises to a liquid projection energy generating member, various means such as an electro-thermal converting member (for example, a heater) or an electro-mechanical converting member (for example, piezoelectric element) would come to mind, but the present embodiment will be described particularly with respect to a case where the liquid drop projection means 106 is an electro-thermal converting member. Operation of the maintenance system of the present embodiment will hereinafter be described by reference to FIG. 1.

For example, in the process wherein liquid subjected to the thermal energy action by the liquid drop projection means 106 becomes bubbles in the vicinity of the ink supply paths 105 or liquid discharge ports and such bubbles disappear after drops of liquid have been projected, the disappearance of the bubbles may sometimes be incomplete for some reason or other. If the bubbles remain, those bubbles will be subjected to the thermal energy action by the liquid drop projection means 106 and will suck the pressure generated by the next bubble generation for causing the liquid to be projected and thus, the projection pressure will not rise and projection will become impossible. In such a case, the discharge ports 107 may first be closed by the use of the plate 101, whereafter the ink in the ink supply paths 105 and in the vicinity of the discharge ports may be sucked and removed with the aforementioned residual bubbles by a negative pressure generating apparatus (not shown) via the ink flow paths 104 and the tube 109 communicating therewith, and thereafter the plate 101 may be separated from the discharge ports 107, whereby projection can be again started.

As a matter of course, even when obstacles are present in the discharge ports, those obstacles can be eliminated via a similar process.

Also, small obstacles and small bubbles can be eliminated by causing the ink to flow always from the tube 108 toward the tube 109 and therefore, a good condition can be maintained even if a recovering operation is not effected.

According to the present invention, the opening area Rs of each ink flow path 104 can be readily made greater than the opening area Os of each discharge port 107 and therefore, large obstacles which have heretofore been a problem can be simply eliminated from the discharge ports 107. However, where the opening area Rs is ten times as great as the opening area Os or greater, the resistance to the variation in the pressure on the ink flow path side becomes too small and thus, the projection pressure may be reduced to aggravate the quality of printing or the like in some cases. Generally, however, a more preferable result may be obtained when the relation between the opening area Os and the oopening area Rs is in the following range:

$$20 > Rs/Os > 1.$$

Further, the relation between the opening area Rs of each ink flow path 104 and the opening area Ls of each ink supply path 105 should more preferably be Rs≦ Ls because the ink is supplied from a side of lower resistance and this may lead to the undesirable possibility that the bubbles and obstacles flow back when further bubbles disappear immediately after projection.

In the present embodiment, the ink flow paths 104 can be made at the same time in the vicinity of the liquid discharge ports and on the same base plate as the ink supply paths 105 or the like. Accordingly, the manufacturing cost does appreciably differ from that in the conventional case where the ink flow paths 104 were absent. Also, the arrangement density of the discharge ports can be made just the same as that in the case where the ink flow paths 104 were absent.

In the present embodiment, the tube 108 provides the ink inflow side and the tube 109 provides the outflow side, but these inflow and outflow sides may also be reverse to each other. However, it is preferably that the openings areas of each ink flow path 104, each ink supply path 105 and each discharge port 107 be within the aforesaid ranges.

Also. of course, the tube 108 and the tube 109 need not always be arranged on the same side as in the embodiment.

According to the present invention, as described above in detail, obstacles larger than the discharge ports which it has heretofore been difficult to eliminate can be easily eliminated. Accordingly, during assembly of the ink jet head, control of dust as well as control of ink becomes easier than before.

Also, according to the present invention, there can be provided an ink jet recording apparatus which is of a high quality and which is capable of effecting recording for a long time.

What we claim is:

1. A liquid injection recording apparatus comprising:
- a plurality of liquid flow paths provided on a base plate;
- a plurality of inflow paths and outflow paths in communication with respective said liquid flow paths;
- a plurality of electro-thermal converting members disposed in respective said liquid flow paths; and
- a plurality of discharge ports in respective said liquid flow paths, said discharge ports being disposed in correspondence with respective said electro-thermal converting members, wherein each said discharge port has an opening area Os, each said outflow path has a flow area Rs and the ratio Rs/Os for respective said discharge ports and outflow paths is less than 20 and greater than 1.

2. A liquid injection recording apparatus according to claim 1, wherein each said inflow path has a flow area Ls for supplying liquid to said liquid flow paths and Rs≦ Ls for said respective outflow and inflow paths.

* * * * *